United States Patent
Behrens et al.

(10) Patent No.: US 9,123,174 B2
(45) Date of Patent: Sep. 1, 2015

(54) METHOD AND APPARATUS FOR DISPLAYING A SIMULATED APPLICATION OF AT LEAST ONE COATING TO A DIGITAL IMAGE

(75) Inventors: Phillip J. Behrens, McDonald, PA (US); Jeffrey Lipniskis, Sarver, PA (US); Srinivas Narasimhan, McDonald, PA (US); Mathew A. Ficco, McDonald, PA (US); Christopher Caruso, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 490 days.

(21) Appl. No.: 13/438,001

(22) Filed: Apr. 3, 2012

(65) Prior Publication Data
US 2013/0257888 A1    Oct. 3, 2013

(51) Int. Cl.
| | |
|---|---|
| G09G 5/00 | (2006.01) |
| G09G 5/02 | (2006.01) |
| G09G 5/36 | (2006.01) |
| H04N 1/46 | (2006.01) |
| H04N 1/387 | (2006.01) |
| G06K 9/36 | (2006.01) |
| G06K 9/34 | (2006.01) |
| G06K 9/40 | (2006.01) |
| G06T 11/40 | (2006.01) |
| G06T 11/00 | (2006.01) |

(52) U.S. Cl.
CPC ........ G06T 11/40 (2013.01); G09G 5/02 (2013.01); *G06T 11/001* (2013.01); *H04N 1/387* (2013.01)

(58) Field of Classification Search
USPC .......... 345/594, 626, 630; 358/520, 530, 533, 358/540, 448; 382/162, 266, 274, 276, 283, 382/305, 307; 715/700, 764
See application file for complete search history.

(56) References Cited

U.S. PATENT DOCUMENTS

| | | | |
|---|---|---|---|
| 5,798,943 | A | 8/1998 | Cook |
| 6,343,264 | B1 | 1/2002 | Fenton |
| 6,507,824 | B1 | 1/2003 | Yon |
| 6,760,483 | B1 * | 7/2004 | Elichai et al. ................. 382/241 |
| 6,901,379 | B1 | 5/2005 | Balter |
| 6,924,817 | B2 | 8/2005 | Rice |
| 6,928,454 | B2 | 8/2005 | Menner |
| 7,062,722 | B1 | 6/2006 | Carlin |
| 7,106,343 | B1 | 9/2006 | Hickman |
| 7,187,386 | B2 | 3/2007 | Rice |
| 7,193,632 | B2 | 3/2007 | Rice |

(Continued)

FOREIGN PATENT DOCUMENTS

| | | |
|---|---|---|
| WO | 2005124301 | 12/2005 |
| WO | 2006078858 | 7/2006 |

(Continued)

*Primary Examiner* — Wesner Sajous
(74) *Attorney, Agent, or Firm* — John Caleb Franklin (57) ABSTRACT

A computer implemented method that includes enabling, using a processor, a user to identify a first area of a digital image, wherein the first area will be colored with a first color. The method also includes segmenting, using the processor, the digital image into a first segment that represents the first area and a second segment that represents a second area of the digital image, wherein an original color of the second area will remain unchanged. The method further includes enabling, using the processor, the user to select the first color, wherein the first color corresponds a first coating color, and displaying, using the processor, the digital image with the first segment colored with the first color.

23 Claims, 11 Drawing Sheets

(56) References Cited

U.S. PATENT DOCUMENTS

| | | |
|---|---|---|
| 7,230,629 B2 | 6/2007 | Reynolds |
| 7,330,585 B2 | 2/2008 | Rice |
| 7,509,271 B2 | 3/2009 | Uchimi |
| 7,536,048 B2 * | 5/2009 | Moravec et al. ............. 382/164 |
| 7,536,231 B2 | 5/2009 | McClanahan |
| 7,605,824 B2 | 10/2009 | Reynolds |
| 7,815,435 B2 | 10/2010 | Riley |
| 7,909,241 B2 | 3/2011 | Stone |
| 7,953,274 B2 | 5/2011 | Sara |
| 7,999,825 B2 | 8/2011 | Webb |
| 8,065,314 B2 | 11/2011 | Prakash |
| 8,290,253 B1 * | 10/2012 | Wang et al. ................ 382/162 |
| 2002/0002497 A1 | 1/2002 | Tilman |
| 2002/0184232 A1 | 12/2002 | Menner |
| 2003/0197710 A1 | 10/2003 | Gonsalves et al. |
| 2003/0216972 A1 | 11/2003 | Gotou |
| 2004/0046802 A1 | 3/2004 | Wright |
| 2004/0158505 A1 | 8/2004 | Kurns |
| 2005/0090919 A1 | 4/2005 | Pogue |
| 2005/0157926 A1 * | 7/2005 | Moravec et al. ............. 382/173 |
| 2005/0281480 A1 | 12/2005 | Baldwin |
| 2006/0001677 A1 | 1/2006 | Webb |
| 2006/0195369 A1 | 8/2006 | Webb |
| 2006/0232802 A1 | 10/2006 | Gray |
| 2008/0056563 A1 * | 3/2008 | Schiller et al. ................ 382/159 |
| 2008/0162157 A1 | 7/2008 | Daniluk |
| 2008/0228599 A1 | 9/2008 | Webb |
| 2008/0255976 A1 | 10/2008 | Altberg |
| 2008/0284791 A1 | 11/2008 | Bressan et al. |
| 2009/0183122 A1 | 7/2009 | Webb |
| 2009/0300553 A1 * | 12/2009 | Pettigrew et al. ............. 715/856 |
| 2009/0324068 A1 * | 12/2009 | Yamakawa ................... 382/165 |
| 2010/0067786 A1 * | 3/2010 | Wilensky et al. ............. 382/165 |
| 2010/0262551 A1 | 10/2010 | Caruso |
| 2011/0299099 A1 * | 12/2011 | Xu et al. ....................... 358/1.9 |
| 2012/0206479 A1 | 8/2012 | Bryant et al. |
| 2013/0215143 A1 * | 8/2013 | Pettigrew et al. ............. 345/619 |

FOREIGN PATENT DOCUMENTS

| | | |
|---|---|---|
| WO | 2006093689 | 9/2006 |
| WO | 2008045418 | 4/2008 |
| WO | 2010120873 | 10/2010 |

* cited by examiner

METHOD AND APPARATUS FOR DISPLAYING A SIMULATED APPLICATION OF AT LEAST ONE COATING TO A DIGITAL IMAGE

FIELD OF THE INVENTION

In various embodiments, the present invention relates to a method and system for displaying a simulated, or virtual, representation of an application of a coating to a surface.

BACKGROUND OF THE INVENTION

Architectural, automotive and aerospace coatings, including indoor and outdoor paints, stains and industrial coatings are commonly provided in a large variety of colors. Paint color display systems are used to display various paint color samples to assist consumers in selecting paint colors. These systems typically involve the use of a display board, pamphlet, book, or multi-tiered display with ink-based or paint color samples. A difficulty arises in selecting a paint color to match or coordinate with the paint colors and furnishings that are in proximity to the surface that is to be painted, such as, for example, a room. The color samples are typically produced on a paper substrate that are on the order of the size of a business card and, in the case of a room to be painted, the samples are taken into the room and compared to the furnishings therein. The small paint color samples are difficult to compare to all of the colors that are present because the samples are relatively small in relation to the surroundings of the surface that will be painted. It is thus difficult to obtain an accurate impression of the finished environment with the selected color. In many cases, the user tries to imagine how the environment will appear when a coating is applied to the surface to be painted in the color of a small sample, but the visualization is difficult to do.

Various coatings manufacturers and sellers have developed computer based software tools that allow users to access via, for example, the Internet, and that provide users the ability to display a paint color on a paintable surface of either a stock photograph or a user uploaded digital photograph. In the former type of system, the stock photographs are selected from a list of, for example, room type (e.g., bedroom, living room, etc.). In the latter example, the user is able to upload a custom photograph that depicts a surface or surfaces to be painted. The user may then instruct the software to display a surface or multiple surfaces in one or more paint colors that are available for purchase. Such systems have the disadvantage that they do not work well when the uploaded digital photographs have images of extraneous objects or surfaces that are not to be painted. Oftentimes the software that comprises such systems cannot distinguish between a surface to be painted and such extraneous objects or surfaces, and thus the displayed result is unsatisfactory to the user.

A need remains for a system for accurately depicting, in a digital image, how a surface that is in the presence of other surfaces or objects will look when painted with a particular paint color.

SUMMARY OF THE INVENTION

In a first aspect, the invention provides a computer implemented method that includes enabling, using a processor, a user to identify a first area of a digital image, wherein the first area will be colored with a first color. The method also includes segmenting, using the processor, the digital image into a first segment that represents the first area and a second segment that represents a second area of the digital image, wherein an original color of the second area will remain unchanged. The method further includes enabling, using the processor, the user to select the first color, wherein the first color corresponds a first coating color, and displaying, using the processor, the digital image with the first segment colored with the first color.

In another aspect, the invention provides a system that includes a user interface and a processor configured to communication with the user interface. The processor is programmed to:
  enable a user to identify, using the user interface, a first area of a digital image, wherein the first area will be colored with a first color;
  segment the digital image into a first segment that represents the first area and a second segment that represents a second area of the digital image, wherein an original color of the second area will remain unchanged;
  enable the user to select, using the user interface, the first color, wherein the first color corresponds a first coating color; and
  display the digital image with the first segment colored with the first color.

In another aspect, the invention provides an apparatus that includes means for enabling a user to identify a first area of a digital image, wherein the first area will be colored with a first color. The apparatus also includes means for segmenting the digital image into a first segment that represents the first area and a second segment that represents a second area of the digital image, wherein an original color of the second area will remain unchanged. The apparatus further includes means for enabling the user to select the first color, wherein the first color corresponds a first coating color, and means for displaying the digital image with the first segment colored with the first color.

In another aspect, the invention provides a non-transitory computer readable medium including software for causing a processor to:
  enable a user to identify a first area of a digital image, wherein the first area will be colored with a first color;
  segment the digital image into a first segment that represents the first area and a second segment that represents a second area of the digital image, wherein an original color of the second area will remain unchanged;
  enable the user to select the first color, wherein the first color corresponds a first coating color; and
  display the digital image with the first segment colored with the first color.

DETAILED DESCRIPTION OF THE INVENTION

In various aspects, embodiments of the invention provide a method and apparatus for visualizing how a coating will appear on one or more surfaces. In one aspect, the invention provides a method and apparatus for a user to visualize how an interior or exterior surface of an object such as a portion of a structure (e.g., a wall), an automobile, etc., will appear after the surface has been coated with, for example, one or more paint colors. While the following description frequently refers to paint, it should be understood that the method and apparatus apply to other types of coatings, including stain and industrial coatings.

The described embodiments of the invention should not be considered as limiting. A method consistent with the present invention may be practiced in a variety of fields such as the matching and/or coordination of apparel and fashion products.

The method of embodiments of the invention is suited for use with a computer system that may be a stand alone unit or include one or more remote terminals or devices in communication with a central computer via, for example, the Internet. As such, the computer or "processor" and related components described herein may be a portion of a local computer system or a remote computer or an on-line system or combinations thereof. The database and software described herein may be stored in computer internal memory or in a non-transitory computer readable medium.

Figure 1:
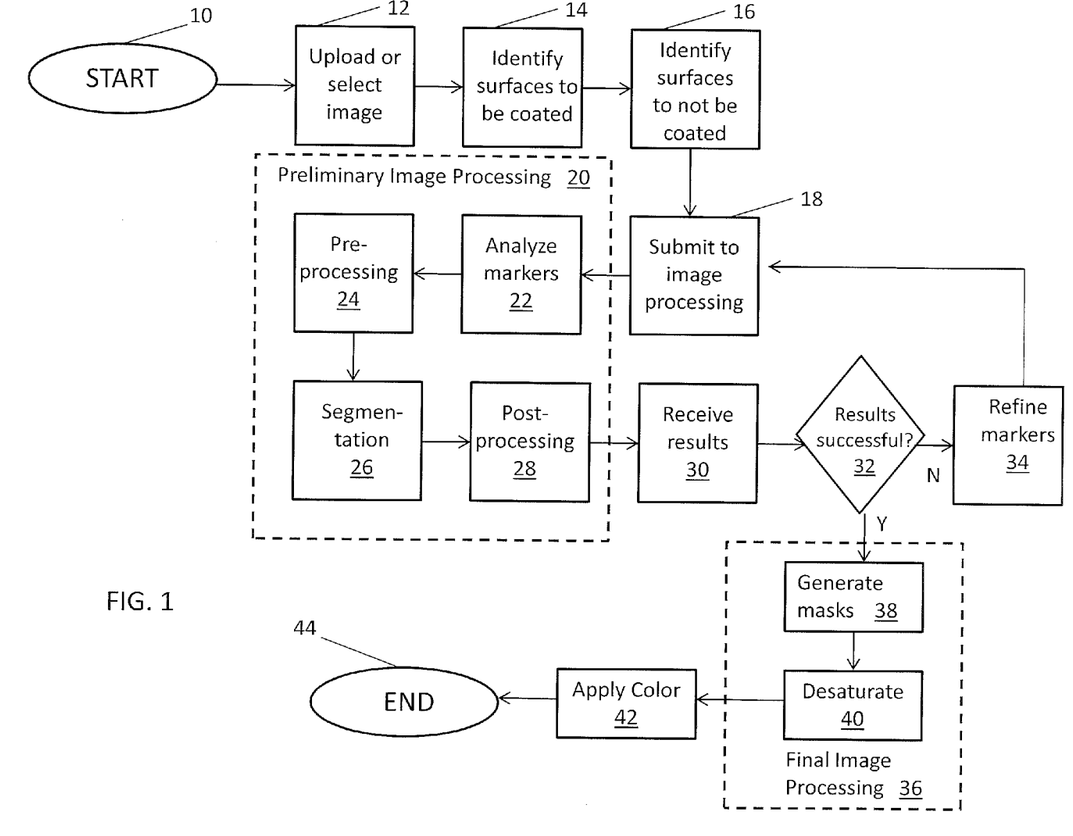
FIG. 1 is a flow chart of an embodiment of a process for virtually displaying how a selected coating will appear on the surface of an object that is depicted in a digital image.

FIG. 1 is a flow chart of an embodiment of a process for virtually displaying how a selected coating will appear on the surface of an object that is depicted in a digital image, such as a two-dimensional or three-dimensional digital photograph, digital scan of a photograph, digital rendering, digital drawing, etc. The digital image may be in a compressed format or an uncompressed format and may be in a raw image format or a processed image format. The digital image may be an image that is captured or rendered by a user and then uploaded for use with the systems and methods described herein or the digital image may be a "stock" image that is contained in storage and that can be selected by the user for use with the systems and methods described herein.

The process of FIG. 1 starts at 10 by, for example, a user visiting a particular website, the user invoking the process on a kiosk located in a store or other place of business, the user invoking a software application such as a mobile application ("app") or a standalone software or firmware program or application, or the user invoking any other type of software or firmware process, module or system. At step 12, the process prompts the user to either upload a digital image from, for example, a computer such as a personal computer or a laptop computer or a mobile device such as a mobile phone or personal digital assistant ("PDA"), or to select a stock image from a list or collection of digital images that are made available to the user. Such stock images may relate to the subject matter of which the user wants to visualize after application of a certain paint color or colors. For example, in the case of the user desiring to visualize the appearance of a wall after receiving a certain paint color, the user could select a stock image of the type of room in which the wall to be painted is located (e.g., a stock image of a living room, bedroom, kitchen, etc.).

At step 14, the user is given the ability to identify a surface or multiple surfaces in the digital image that are to receive a certain paint color or colors. At the end of the process illustrated in FIG. 1, the identified surface or surfaces will thus be colored, in the digital image, with the selected paint color or colors so that the user can visualize how the surface or surfaces will appear in relation to its surroundings after the surface is coated. In various embodiments, the user, via a user interface, is able to "tag" one or more portions of the digital image by, for example, dragging and dropping icons to the desired areas of the digital image or by selecting portions of the image via a keyboard keystroke or a mouse click. In the case of multiple surfaces on which the user desires to visualize a coating, multiple types of icons may be offered to the user, with each icon representing a different surface to be visualized with a coating.

At step 16, the user is given the ability to identify (i.e., "tag") a surface or multiple surfaces in the digital image that are not to receive any paint color (i.e., a surface or surfaces that will have the same appearance at the end of the process of FIG. 1 as at the beginning of the process). In various embodiments, the user, via a user interface, is able to tag one or more portions of the digital image by, for example, dragging and dropping icons to the desired areas of the digital image or by selecting portions of the image via a keyboard keystroke or a mouse click. By way of example, an icon representing a surface that will not receive any paint color could be represented by the letter "X". Also, at step 16 the user is given the ability to denote boundaries on the digital image. For example, in the case where the digital image shows a wall and a ceiling, the user may use a graphical tool to denote the boundary where the wall meets the ceiling. In another example, in the case where the digital image shows a vehicle, the user may use a graphical tool to denote the boundary where the windshield meets the body of the vehicle.

At step 18, the user can choose to submit the digital image, as tagged with identifiers, to be preliminarily processed at 20.

At step 22, the tags that were added by the user to the digital image are analyzed. At step 24, edge detection analysis is performed to detect the edge of each surface that was tagged by the user at steps 14 and 16. At step 26, segmentation is performed and at step 28 boundary simplification is performed on the digital image. In various embodiments, segmentation at step 26 is performed using a graph-based region growing algorithm that divides the digital image into segments, with each segment representing a surface or surfaces that will either receive a new color (i.e., receive a virtual coating) or will remain the original color (i.e., will not receive a virtual coating).

At step 30, the preliminary image processing results are received and are displayed on a display. In various embodiments, the surface or surfaces that the user has tagged or identified to receive a color may be indicated by, for example, a certain pattern (e.g., stripes, hashes, etc.). At step 32 the user decides, based on the displayed image of step 30, whether the boundaries that were delineated for the various tagged surfaces in the image at 20 are acceptable. If the boundaries are not acceptable to the user, at step 34 the user may, using a user interface, add or remove tags to the image as described hereinabove with respect to steps 14 and 16.

If the boundaries are acceptable to the user, the image may be processed at 36, where image marks are generated at step 38 and desaturation (i.e., colored areas are replaced with a white pigment) of tagged surfaces may be performed at step 40. At step 42, the digital image may be displayed to the user with the tagged surfaces desaturated. The user may then add selected colors to the desaturated areas by, for example, selecting colors from a list or graphical display, and dragging and dropping an icon representing the color onto the digital image. Step 42 may be repeated until the user is satisfied with the results, and the digital image with the added color or colors may be, for example, saved, discarded, or printed, and the process ends at step 44.

Figure 2:
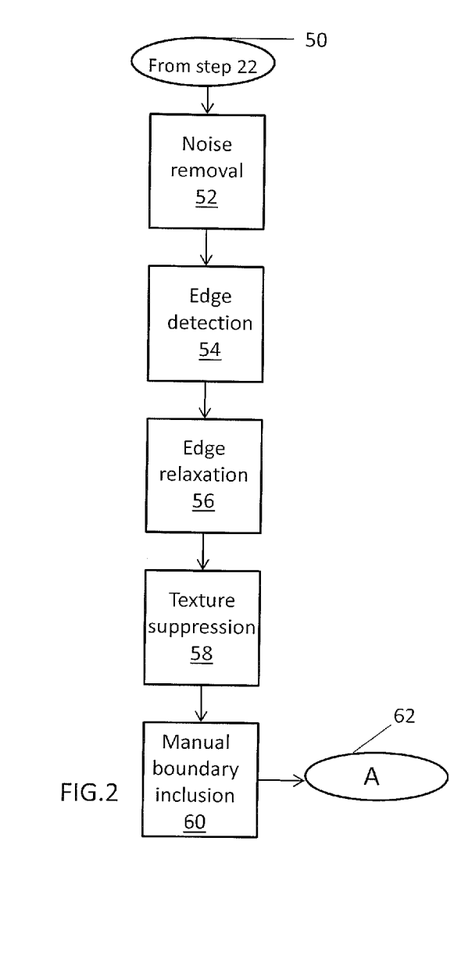
FIG. 2 is a flow chart of an embodiment of a process for preprocessing a digital image.

FIG. 2 is a flow chart of an embodiment of a process for the preprocessing step 24 of FIG. 1. The process starts at 50, where it is entered from step 22 of FIG. 1. At step 52, undesirable image noise, which results from variations in brightness and/or color information, may be removed or suppressed. In various embodiments, the noise may be suppressed using a filter, such as a bilateral filter that uses Gaussian smoothing, which preserves the edges of the image while suppressing the image noise.

At step 54, edge detection may be performed on the digital image. The edges of the digital image act as natural boundaries between segments of the image, and thus the edge detection results may be used to segment the image. In various embodiments, a Canny edge detector may be used to identify "strong" (i.e., real images). Edge detection may be sensitive to image noise, resulting in gaps in the detected edges. At step 56, edge relaxation may be performed iteratively to extend the detected edges to fill the gaps.

Textures on surfaces of objects in the digital image may require additional image processing. Such textures may include, for example, interior walls having wallpaper or patterns, exterior walls constructed of brick or siding, etc. At step 58, texture suppression may be performed by first detecting the presence of a textured surface by, for example, analyzing the areas adjacent to the tags added by users to determine if such areas have a strong distribution of Canny edges as determined at step 54. Such areas may then be used as templates in which to search for other areas in the image that correlate with the areas that have a strong distribution of Canny edges. When there is a correlation, the Canny edges within the areas that correlate with the areas that have a strong distribution of Canny edges are deleted. The process performed at step 58, in various embodiments, retains strong edges and removes edges that are improperly located on a surface that should not be segmented, thus allowing the use of a single algorithm to segment the image.

At step 60, any boundaries that were marked by the user at step 16 may be combined with the edges, and at step 62 the process advances to step 26.

Figure 3:
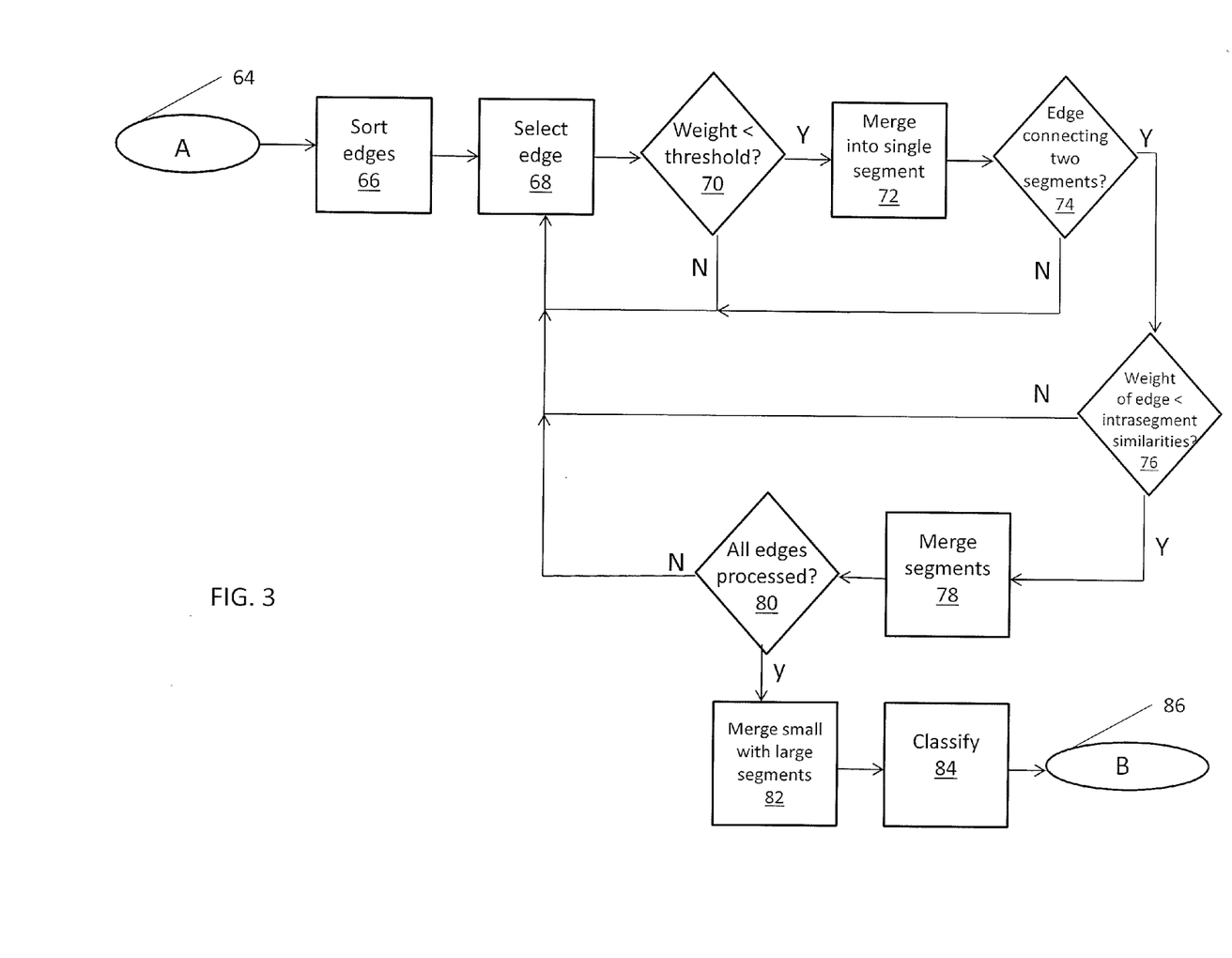
FIG. 3 is a flow chart of an embodiment of a process for wall segmentation of the digital image.

FIG. 3 is a flow chart of an embodiment of a process for the segmentation step 26 of FIG. 1. The process starts at 64, where it is entered from step 24 of FIG. 1. The digital image that is to be segmented may be represented as an undirected graph, with each pixel of the image being a vertex in the graph. Each pair of adjacent pixels may be connected by an undirected edge whose weight is the intensity and color differences between the two pixels. Two pixels with similar color and brightness values yield a graph edge with a lower weight. Edges between adjacent pixels (i.e., vertices in the graph) are unlinked in the graph if a Canny edge, as detected at step 54 of FIG. 2, exists between the pixels. In various embodiments, for any two pixels that lie on the same user tag, the weight of the edge between the pixels is fixed to be zero.

In various embodiments, the process of FIG. 3 may use a bottom-up approach in which pixels that are similar in appearance are aggregated so that large segments of surfaces of the digital image are obtained. In various embodiments, the pixels tagged by the user may be used as seeding points for the aggregation process. At step 66 in FIG. 3, the edges of the graph may be sorted in non-decreasing order based on weight. At step 68, the edge with the lowest weight may be selected and at step 70 the weight may be compared to a threshold. The threshold denotes how quickly a segment is allowed to grow and how large a segment is allowed to be. If the weight is greater than or equal to the threshold, the process returns to step 68. If the weight is less than the threshold, the two pixels between which the edge is located may be merged into a single segment at step 72.

At step 74, the process may determine whether the edge connects two pixels that belong to two different segments. If not, the process returns to step 68. If so, at step 76 the process may determine whether the weight of the edge is less than the intra-segment similarities between the two segments at step 76. If not, the process returns to step 68. If so, the process may merge the two segments at step 78.

At step 80, the process may determine whether all of the edges have been processed. If not, the process returns to step 68. If so, small segments may be merged with neighboring segments at step 82 and then every segment may be classified as either a surface that is to be painted or a surface that is not to be painted at step 84 based on the user defined tags. In various embodiments, the tagged segments may be represented as a gray scale mask, where the value of a pixel represents the segment to which it belongs. The process then proceeds to step 28 of FIG. 1.

Figure 4:
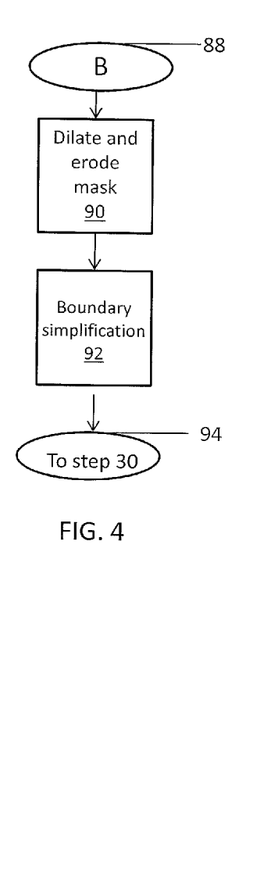
FIG. 4 is a flow chart of an embodiment of a process for post-processing the digital image.

FIG. 4 is a flow chart of an embodiment of a process for the post-processing step 28 of FIG. 1. The process starts at 88, where it is entered from step 26 of FIG. 1. At step 90, the process may erode the mask that was created at step 84 of FIG. 3 to remove any small "holes", finger-like shaped protrusions, and any other appropriate irregularity. At step 92, the boundaries between adjacent segments may be simplified to smooth out the boundaries. In various embodiments, the Ramer-Douglas-Peucker algorithm may be used to simplify the boundaries by reducing them to polylines (polygonal chains). In various embodiments, a threshold may be used to control the coarseness of the polylines. At 94, the process advances to step 30 of FIG. 1.

Figure 5:
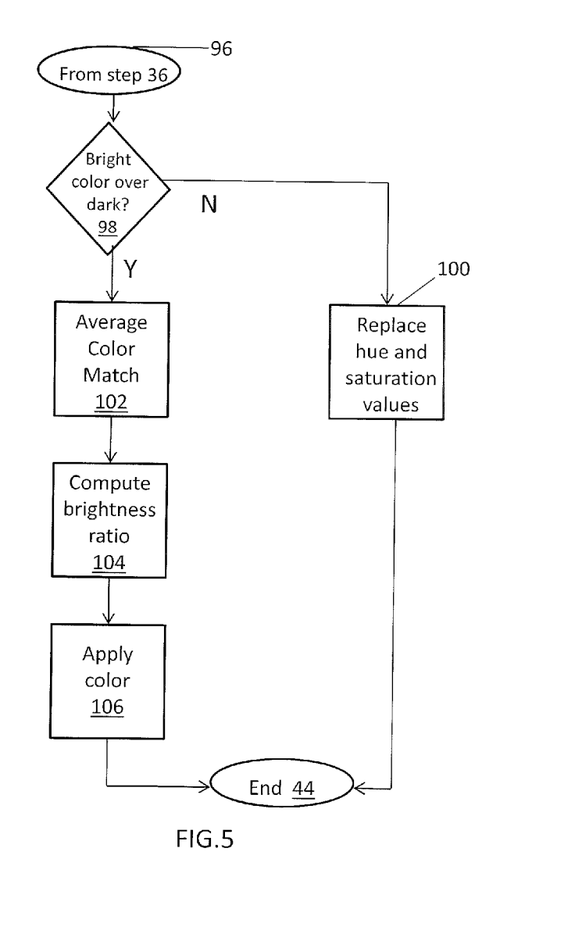
FIG. 5 is a flow chart of an embodiment of a process for applying color to one or more areas of the digital image.

FIG. 5 is a flow chart of an embodiment of a process for the color application step 42 of FIG. 1. The process starts at 96, where it is entered from step 36 of FIG. 1. At step 98, the process may determine whether a bright color is to be applied over a dark color in the digital image. If not, at step 100, the hue and saturation values of the surface may be replaced with those of the selected color and the process ends at step 44 of FIG. 1. In various embodiments, the intensity may be retained throughout the digital image.

Figure 6:
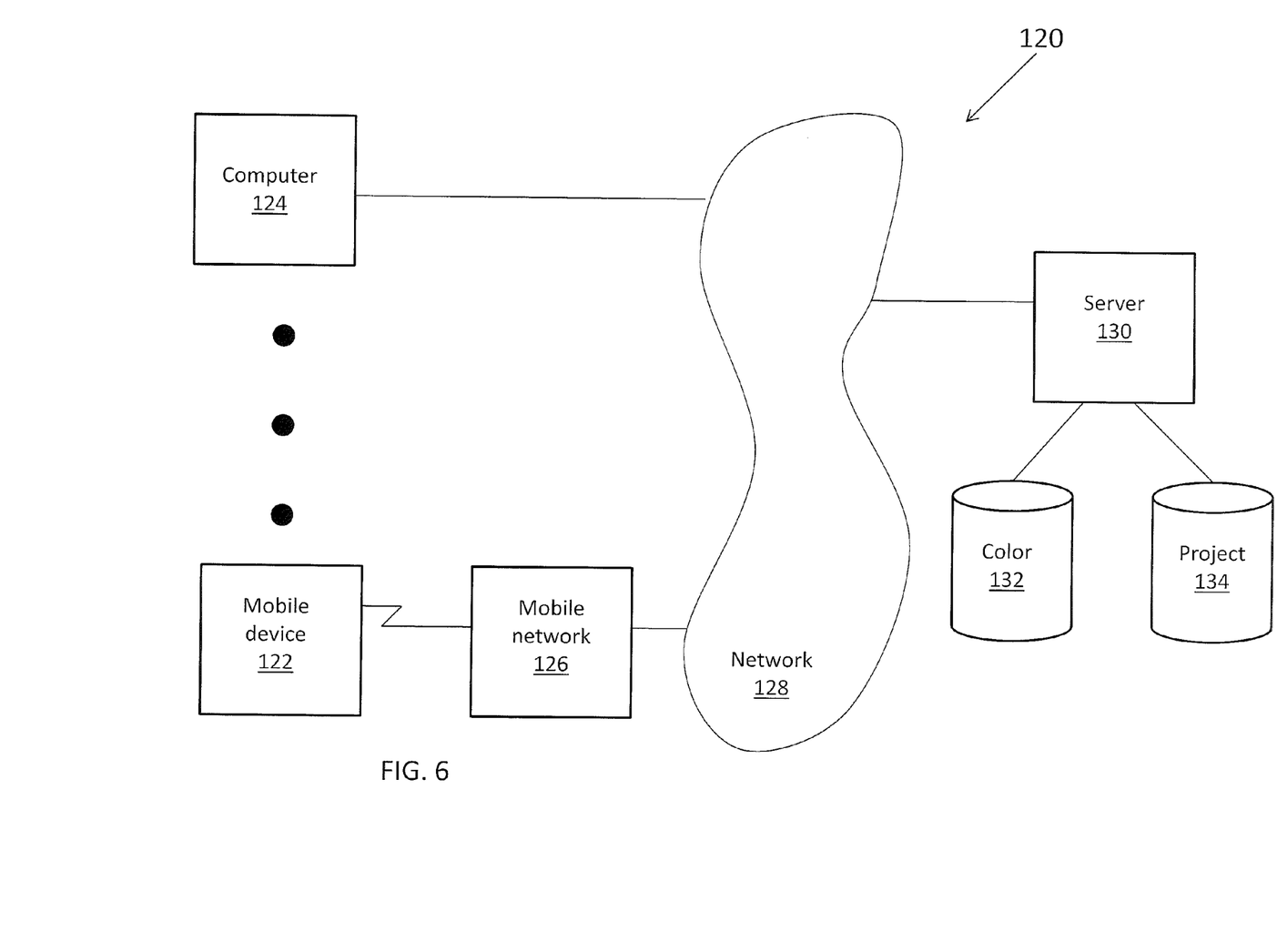
FIG. 6 is a block diagram of an embodiment of a computer system that can be used for selecting a paint color and purchasing paint.

If a bright color is to be applied over a dark color, at step 102, the average color of a segment may be matched with a color in a database of paint colors 132 (FIG. 6). In various embodiments, the minimum distance between two RGB vectors in the segment may be computed to derive the average color of the segment. If the average color cannot be matched because the exposure of the digital image is either too low or too high, the exposure may be changed to match either the darkest or the brightest shade in the database of paint colors 132. At step 104, the ratio of the value channel (i.e., the brightness) of the paint color selected by the user to the value channel of the color match from step 102 may be calculated. At step 106, the ratio calculated at step 104 may be multiplied by the value channel of the pixels of the segment to which color is to be applied in the digital image. The hue and saturation values of the selected color may then be applied to the segment and the process ends at step 44 of FIG. 1.

Various embodiments of the present invention may be used to virtually visualize the replacement of an object in a digital image with another object. For example, in the case of a digital image that depicts a room, the user may tag or identify an object in the room (e.g., a piece of furniture) as described hereinabove. The digital image may then be processed using the methods described herein such that object is removed from the digital image. The user may then select a digital representation of a replacement object and instruct the system described herein (e.g., by dragging and dropping the digital image of the replacement object, etc.) to add the replacement object to the digital image in place of the removed object. A non-limiting example scenario may be when a user desires to visualize the appearance of a new sofa in a room that already contains a sofa. The user would tag the existing sofa in a digital image of the room and instruct the system described herein to remove the sofa. The user would then obtain an image of a new sofa, for example on a furniture website, and then instruct the system to add the new sofa in place of the sofa that was removed from the digital image. The process may be repeated for multiple sofas or for other objects that appear in the digital image. In various embodiments, the replacement object may be dimensioned similarly or the same as the removed object or the replacement object may be dimensioned differently than the removed object.

The various steps and decisions illustrated in FIGS. 1-5 are provided as a possible implementation and are not meant to be limiting.

Example embodiments of the systems and methods described herein were constructed to be used to virtually paint the walls in a room based on a digital image. In the first example, parameters were developed for a 1000 by 1000 pixel image and for the second example, parameters were developed for a 600 by 600 pixel image. The parameters for the 1000 by 1000 image and the 600 by 600 image are illustrated in Table 1. In the Table, segmentation_scale is used to determine the segment similarity for wall segments, segmentation_minsize is the minimum size of the wall segments, and segmentation_space_sigma is the smoothing that is applied to the digital image before segmentation. Bilateral_nhood is the neighborhood size for bilateral filtering, bilateral_space_sigma is the spatial smoothing parameter for bilateral filtering, bilateral_color_sigma is the intensity smoothing parameter for bilateral filtering. Cannyedge_space_sigma is the canny edge detector sensitivity and edge_extend_iterations is the number of times to repeat the edge relaxation algorithm. Curve_simplification_epsilon is the coarseness of the polyline for boundary simplification. Texture_total_num_samples is the number of templates sampled around a user provided tag or marker and texture_halfpatch_size is the size of the sampled templates. Postmorph_strelsize is the size of the morphological structuring element (i.e., the size of the neighborhood window for the morphological operators) and postmorph_iterations is the number of times the morphological operation is applied in succession. Texture_sample_period is how densely texture templates are sampled around user tags and texture_patch_resize_delta is how the template, which is sampled around user tags, is resized (shrunk and enlarged). The resized and original templates are used to perform correlation for texture suppression. Config_flags_edge_extend enables and disables edge relaxation, config_flags_simplify_contour enables and disables boundary simplification of wall segments, and config_flags_texture_anaysis enables and disables texture suppression.

TABLE 1

| PARAMETER | 600 × 600 | 1000 × 1000 |
| --- | --- | --- |
| segmentation_scale | 5000.0 | 5000.0 |
| segmentation_minsize | 50 | 50 |
| segmentation_space_sigma | 1 | 1.5 |
| bilateral_nhood | 9 | 9 |
| bilateral_space_sigma | 1.5 | 1.5 |
| bilateral_color_sigma | 45 | 45 |
| cannyedge_space_sigma | 1.0 | 1.5 |
| edge_extend_iterations | 10 | 10 |
| curve_simplification_epsilon | 10 | 10 |
| texture_total_num_samples | 30 | 30 |
| texture_halfpatch_size | 15 | 15 |
| texture_sample_period | 100 | 100 |
| texture_patch_resize_delta | 2 | 2 |
| postmorph_strelsize | 5 | 5 |
| postmorph_iterations | 3 | 3 |
| config_flags_edge_extend | 1 | 1 |
| config_flags_simplify_contour | 1 | 0 |
| config_flags_texture_anaysis | 1 | 1 |

It should be appreciated that the methods described in relation to FIGS. 1-5 can be performed on computer systems or networks. The computer components may include databases for storing digital images, software and/or firmware for all tasks described herein, such as applying color to images, processing images, providing a user interface for ease of use by the user, and the like as are conventional in the art.

The processes described herein according to various embodiments can be implemented on a kiosk, a single computer, or a computer system that includes multiple components that may be found in a computer network or a mobile computing network. FIG. 6 is a block diagram of an embodiment of a system 120 that can be used to practice one or more aspects of the invention. The system 120 of FIG. 6 includes one or more user devices that may be used by a user to access the functionality of the systems and methods described herein. The user devices may include, for example, mobile or wireless devices 122 such as, for example, a laptop computer or a mobile device such as a mobile phone or personal digital assistant ("PDA"), or a computer 124, such as a kiosk or a desktop computer. The user devices 122 and 124 may be, for example, user's personal computers or computers located in stores, kiosks or design centers. The user devices 122 and 124 may include a user interface that may include an input device, such as a keyboard, mouse, touch screen, multi-touch screen, etc. and a display. In one embodiment, the display can be a multi-touch display and the user devices 122 and 124 may be programmed to allow a user to manipulate items on the screen using multi-touch technology.

The mobile device 122 may be in communication, via a mobile network 126, to a network 128. The network 128 may be, for example, a local area network ("LAN"), an intranet, a wireless network, the Internet, or any other type of suitable wired or wireless network. The computers 124 may also be in communication with the network 128. A server 130, such as an enterprise server, a web server, etc., may include software that executes embodiments of the methods described herein. The server 130 may be in communication with one or more databases that may include a color database 132 that stores information relating to various coating colors, and a project database 134 that stores information relating to user projects. Information relating to user projects may include, for example, uploaded digital images and digital images that are stored for later retrieval and that show how the application of paint colors to a surface will appear as created using the methods described herein. Information relating to user projects may also include, for example, digital images that are photographs taken by a user after the user applies a coating to a surface. Storage of such images may allow a user to refer to various images as "before" and "after" images. In various embodiments, the software that executes embodiments of the methods described herein may be on a standard devices such as a kiosk, a computer, a mobile device, etc. that executes embodiments of the methods described herein independent of any type of network.

Figure 7:
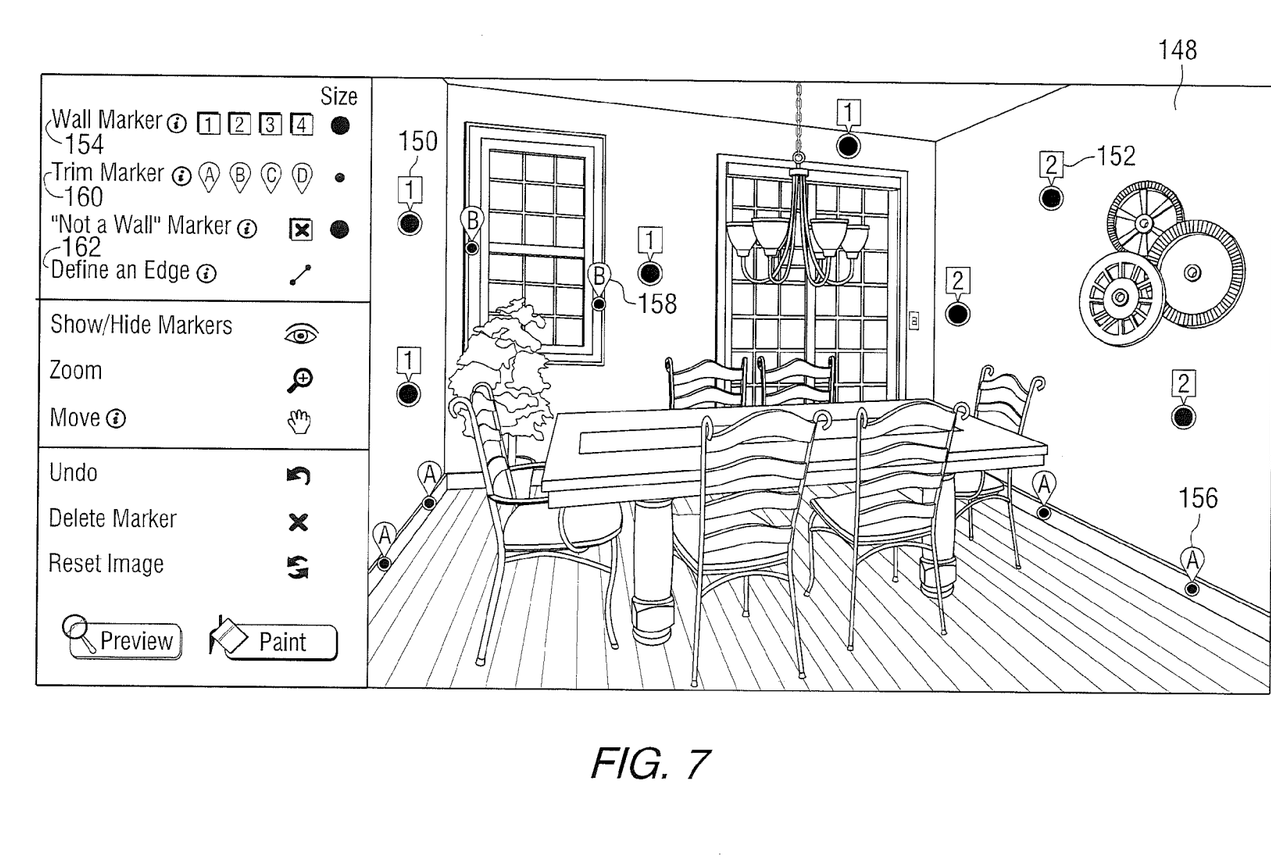
FIG. 7 is a screen shot of an embodiment of a user interface that permits a user to identify surfaces to be coated.

FIG. 7 is a screen shot of an embodiment of a user interface that permits a user to identify surfaces to be coated, as described at step 14 of FIG. 1, in a digital image 148. As can be seen in FIG. 7, the first surface to be painted is a wall, which the user has tagged with markers 150 that are denoted by a "1". The second surface to be painted is also a wall, which the user has tagged with markers 152 that are denoted by a "2". The markers 150 and 152 can be selected from a "Wall Marker" panel 154 and dragged and dropped to the appropriate areas of the digital image 148. A third surface to be painted is baseboard trim, which the user has tagged with markers 156 that are denoted by an "A". The fourth surface to be painted is window trim, which the user has tagged with markers 158 that are denoted by a "B". The markers 156 and 158 can be selected from a "Trim Marker" panel 160 and dragged and dropped to the appropriate areas of the digital image 148. As can be seen in FIG. 7, the user interface includes a tool 162 that permits the user to define a boundary or an edge on the digital image 148.

Figure 8:
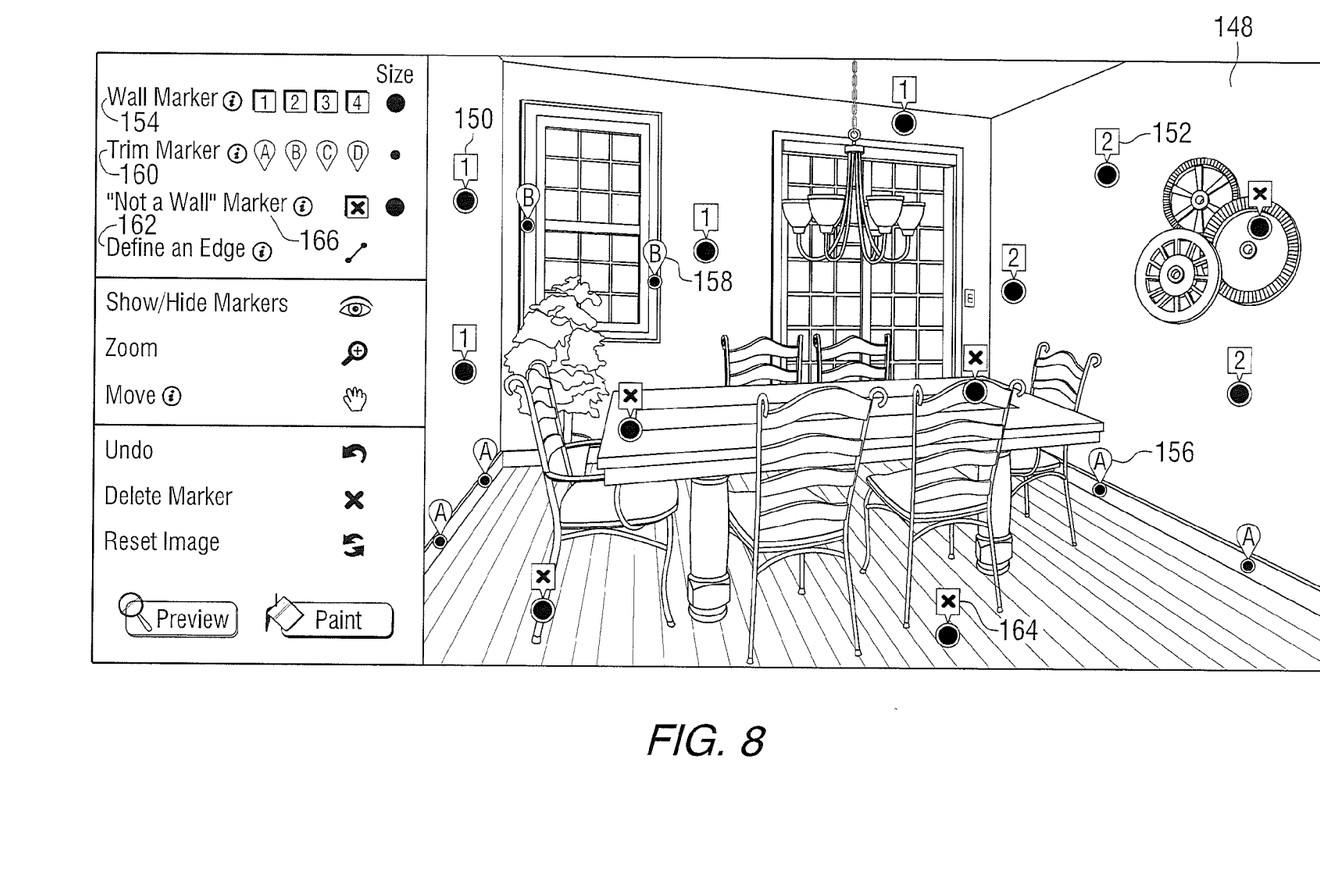
FIG. 8 is a screen shot of an embodiment of a user interface that permits a user to identify surfaces that are not to be coated.

FIG. 8 is a screen shot of an embodiment of a user interface that permits a user to identify surfaces that are not to be displayed with a new coating (i.e., that are not to be virtually painted), as described at step 16 of FIG. 1, in the digital image 148. As can be seen in FIG. 8, the user has tagged surfaces that are not to be coated with markers 164 that are denoted with an "X". The markers 164 can be selected from a "'Not a Wall' Marker" panel 166 and dragged and dropped to the appropriate areas of the digital image 148.

Figure 9:
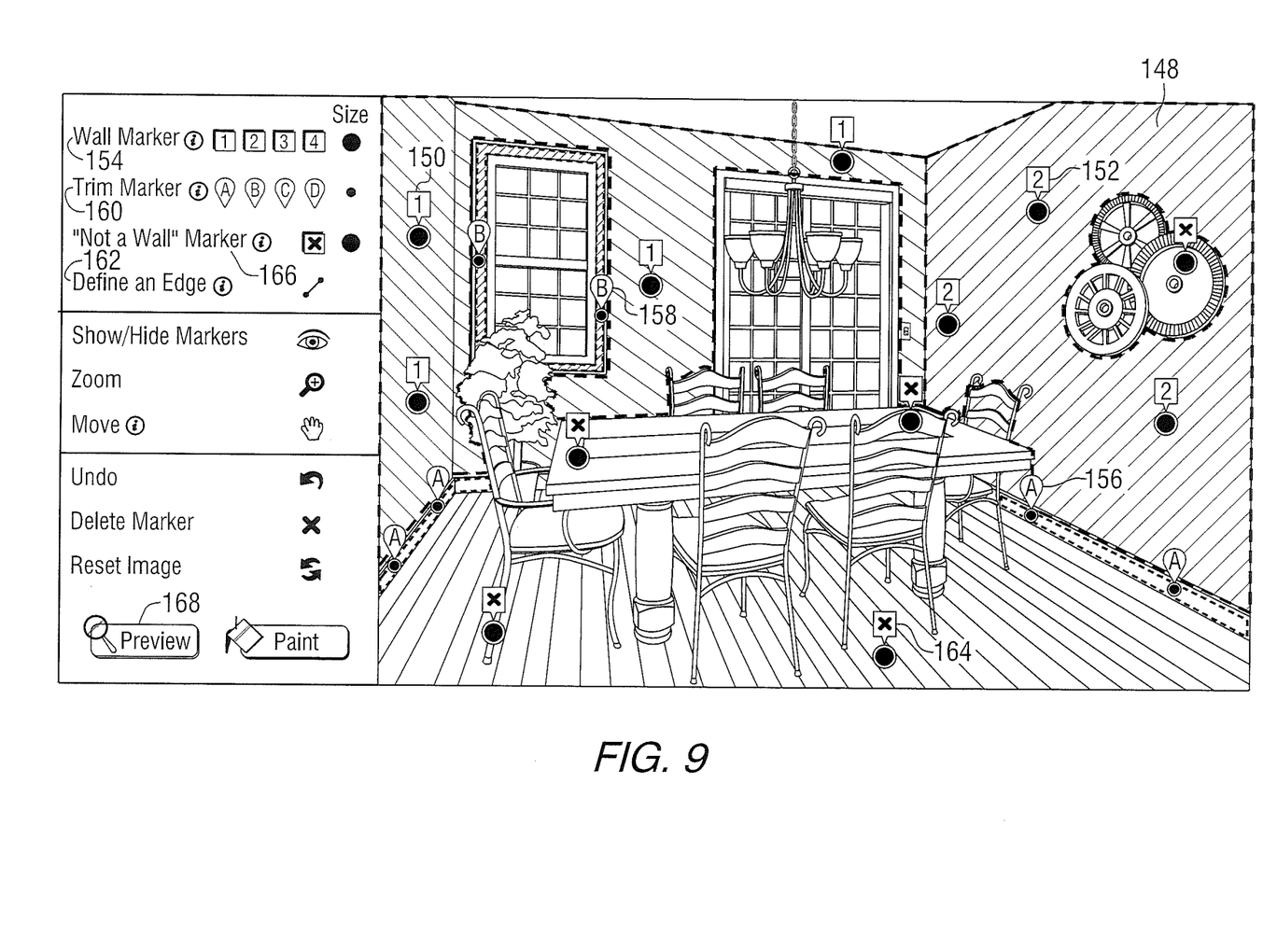
FIG. 9 is a screen shot of an embodiment of a user interface that displays the results of preliminary image processing of the digital image.

FIG. 9 is a screen shot of an embodiment of a user interface that displays the results of preliminary image processing, as described at step 30 of FIG. 1, of the digital image after the user selects a "Preview" tab 168. As can be seen in FIG. 9, the surfaces to be coated (i.e., those denoted by markers 150, 152, 156 and 158) are patterned with, for example, various hash patterns. The image displayed in FIG. 9 permits the user to determine whether any adjustments need to be made to the placement or number of markers 150, 152, 156, 158 and 164.

Figure 10:
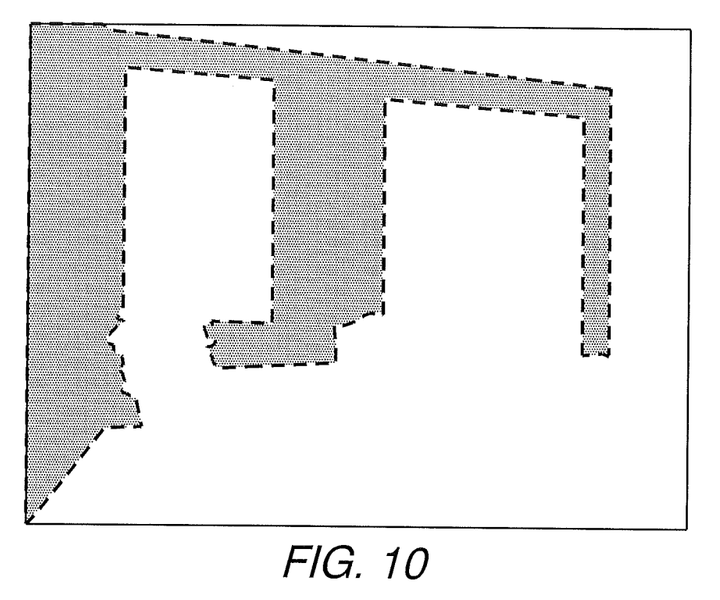
FIGS. 10-13 are graphical representations of image masks that are generated to correspond to various surfaces in the digital image of FIGS. 7-9.
Figure 11:
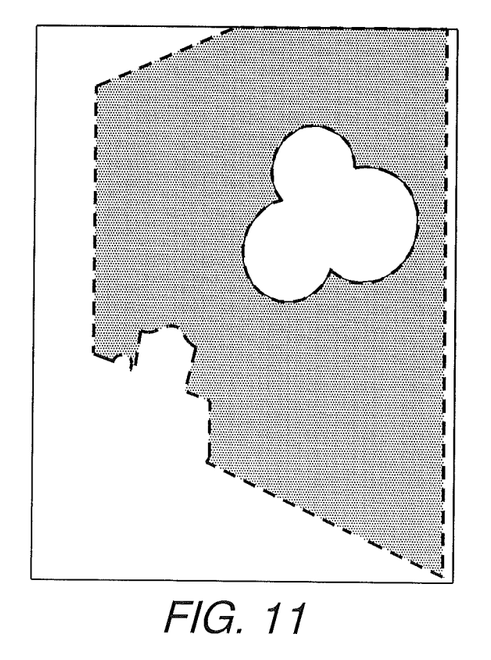
Figure 12:
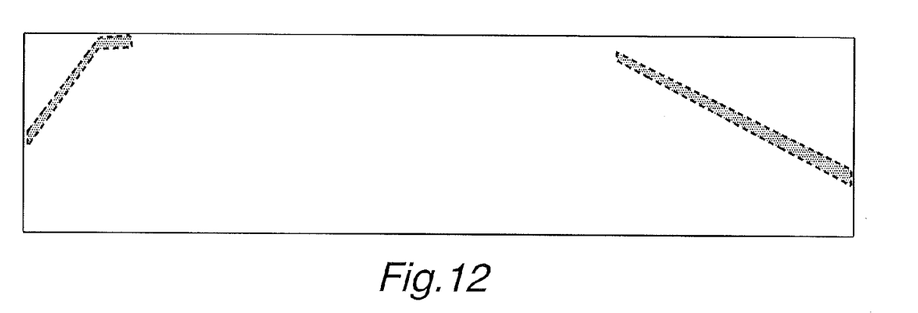
Figure 13:
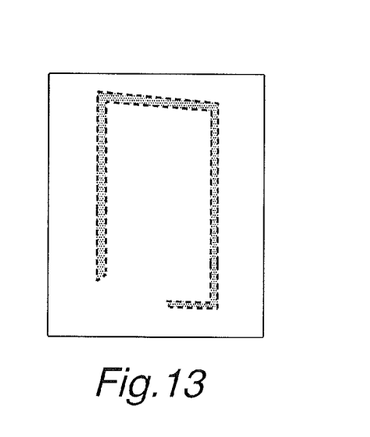

FIGS. 10-13 are graphical representations of image masks that are generated to correspond to various surfaces in the digital image 148 of FIGS. 7-9. FIG. 10 illustrates a mask of the surface denoted by markers 150 and FIG. 11 illustrates a mask of the surface denoted by markers 152. FIG. 12 illustrates a mask of the surface denoted by markers 156 and FIG. 13 illustrates a mask of the surface denoted by markers 158.

Figure 14:
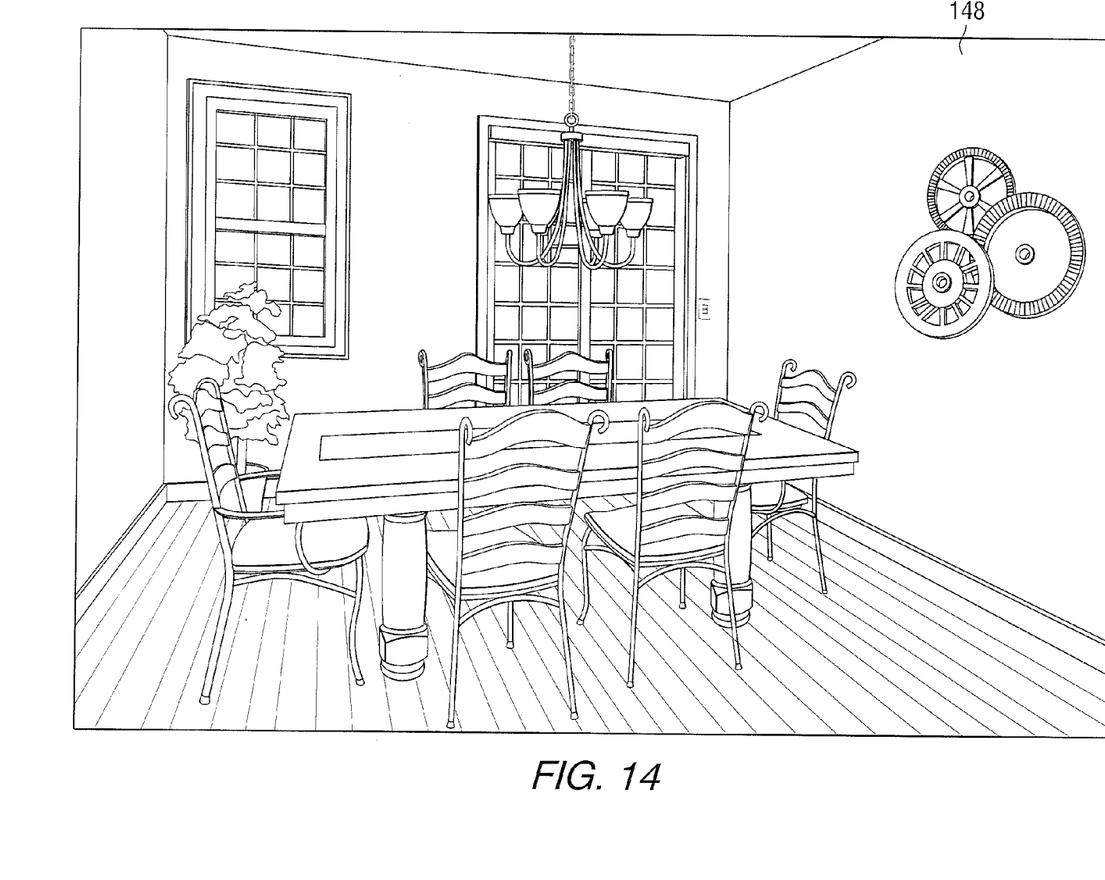
FIG. 14 is a screen shot of an embodiment of a user interface that displays a de-saturated version of the digital image of FIGS. 7-9.
Figure 15:
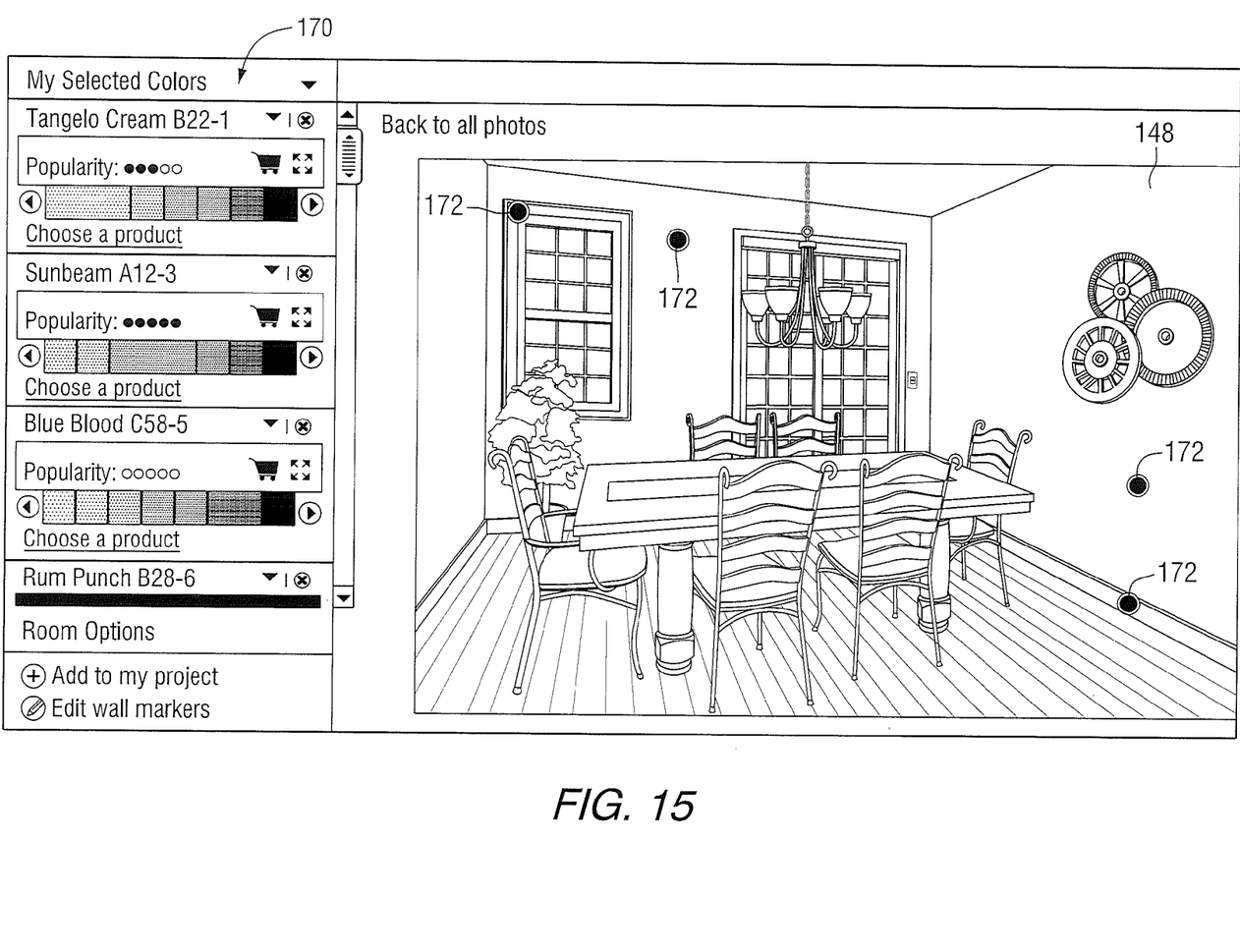
FIG. 15 is a screen shot of an embodiment of a user interface that displays a colorized version of the digital image of FIGS. 7-9.

FIG. 14 is a screen shot of an embodiment of a user interface that displays a de-saturated version, as described in step 40 of FIG. 1, of the digital image 148 of FIGS. 7-9. FIG. 15 is a screen shot of an embodiment of a user interface that displays a colorized version of the digital image 148 of FIGS. 7-9 as described in step 42 of FIG. 1. As illustrated in FIG. 15, the user may select a color from a color selection panel 170. In various embodiments, the color selection panel 170 may display colors that are suggested to the user or colors that are selected by the user from, for example, the database 132. In various embodiments, the user may drag and drop colors from the color selection panel 170 to surfaces that are denoted by markers 172.

Although the embodiments illustrated in FIGS. 7-15 illustrate the use of embodiments of the systems and methods of the present invention in connection with an interior room, such embodiments are exemplary and are not intended to be limiting as to the uses of embodiments of the systems and methods of the present invention.

In another aspect, the invention can be implemented as a non-transitory computer readable medium containing software for causing a computer or computer system to perform the method described above. More specifically, in one embodiment the invention encompasses a non-transitory computer readable medium including software operable in conjunction with a processor and associated display device to enable a user to identify a first area of a digital image, wherein the first area will be colored with a first color; segment the digital image into a first segment that represents the first area and a second segment that represents a second area of the digital image, wherein an original color of the second area will remain unchanged; enable the user to select the first color, wherein the first color corresponds a first coating color; and display the digital image with the first segment colored with the first color. In addition, the software can further implement the other process steps described above, and can provide appropriate links to allow for easy access to social networking sites to solicit comments on results of the methods described herein. The software can include various modules that are used to enable a processor and a user interface to perform the methods described herein.

It will be readily appreciated by those skilled in the art that modifications may be made to the invention without departing from the concepts disclosed in the forgoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A computer implemented method, comprising:
enabling, using a processor, a user to identify a first area of a digital image, wherein the first area comprises an original first area color;
preprocessing, using the processor, the digital image, wherein preprocessing comprises automatically identifying at least one edge between the first area and a second area of the digital image;
segmenting, using the processor, the digital image into a first segment that represents the first area and a second segment that represents the second area wherein an original second area color of the second area will remain unchanged;
enabling, using the processor, the user to select a first color, wherein the first color is different from the original first area color; and
displaying, using the processor, the digital image with at least a portion of the original first area color within the first segment replaced with the first color.

2. The method of claim 1, further comprising generating, using the processor, a first image mask corresponding to the first segment and a second image mask corresponding to the second segment.

3. The method of claim 1, wherein enabling a user to identify a first area of a digital image comprises enabling the user to overlay at least one marker on the digital image.

4. The method of claim 1, further comprising enabling the user to identify at least one boundary on the digital image.

5. The method of claim 1, further comprising uploading the digital image.

6. The method of claim 1, wherein segmenting the digital image comprises executing a graph-based region growing algorithm.

7. The method of claim 1, wherein segmenting the digital image further comprises segmenting the digital image into a third segment that represents a third area of the digital image, wherein the third area comprises an original third area color.

8. The method of claim 7, further comprising enabling the user to select a second color, wherein the second color is different than the original first area color, the original third area color, and the first color.

9. The method of claim 8, wherein displaying the digital image with the first segment colored with the first color further comprises displaying the digital image with the third segment colored with the second color.

10. The method of claim 1, wherein preprocessing the digital image comprises:
suppressing image noise from the digital image; and
identifying whether the first area has a textured appearance.

11. The method of claim 10, further comprising suppressing the textured appearance when the textured appearance is identified.

12. The method of claim 1, wherein enabling the user to select a first color comprises enabling the user to select the first color from a database of commercially available paint colors.

13. The method of claim 1, wherein displaying the digital image with the first segment colored with the first color comprises replacing a hue and intensity of the original first area color with a hue and intensity of the first color.

14. The method of claim 1, wherein segmenting the digital image further comprises segmenting the digital image into a third segment that represents a third area of the digital image, and further comprising replacing the third area with a replacement image.

15. A system, comprising:
a user interface; and
a processor configured to communication with the user interface and programmed to:
receive through the user interface an indication selecting a first area of a digital image, wherein the first area comprises an original first area color;
automatically identify, with the processor, at least one edge between the first area and a second area of the digital image;
receive from a user an indication selecting a first color, wherein the first color is different from the original first area color;
replace at least a portion of the original first area color within the digital image with the first color, wherein the first color comprises a commercially available paint color and the first area comprises a digital image of an area that will be painted with a first paint comprising the first color; and
display the digital image with the first area colored with the first color, wherein the digital image displays a simulated application of the first paint to the first area.

16. The system of claim 15, further comprising a database in communication with the processor, wherein the database stores information relating to a plurality of coating colors.

17. The system of claim 15, further comprising a display in communication with the processor.

18. The system of claim 15, wherein the processor is further programmed to enable the user to upload the digital image.

19. An apparatus, comprising:
means for enabling a user to identify a first area of a digital image, wherein the first area comprises an original first area color;
means for preprocessing the digital image, wherein preprocessing comprises automatically identifying at least one edge between the first area and a second area of the digital image;
means for segmenting the digital image into a first segment that represents the first area and a second segment that represents the second area of the digital image, wherein an original second area color of the second area will remain unchanged;
means for enabling the user to select a first color, wherein the first color is different from the original first area color; and
means for displaying the digital image with at least a portion of the original first area color within the first segment replaced with the first color.

20. A non-transitory computer readable medium including software for causing a processor to:
receive from a user an indication selecting a first area of a digital image, wherein the first area comprises an original first area color;
automatically identify at least one edge between the first area and a second area of the digital image;
receive from the user an indication selecting a first color, wherein the first color is different from the original first area color;
replace at least a portion of the original first area color within the digital image with the first color, wherein the first color comprises a commercially available paint color and the first area comprises a digital image of an area that will be painted with a first paint comprising the first color; and
display the digital image with the first area colored with the first color, wherein the digital image displays a simulated application of the first paint to the first area.

21. A computer implemented method, comprising:
receiving from a user an indication selecting a first area of a digital image, wherein the first area comprises an original first area color;
segmenting, using the processor, the digital image into a first segment that represents the first area and a second segment that represents a second area of the digital image, wherein an original second area color of the second area will remain unchanged, wherein segmenting the digital image comprises executing a graph-based region growing algorithm;
receiving from a user an indication selecting a first color, wherein the first color is different from the original first area color;
replacing at least a portion of the original first area color within the digital image with the first color, wherein the first color comprises a commercially available paint color and the first area comprises a digital image of an area that will be painted with a first paint comprising the first color; and displaying, using the processor, the digital image with the first segment colored with the first color, wherein the digital image displays a simulated application of the first paint to at least a portion of the first segment.

22. A computer implemented method, comprising:

enabling, using a processor, a user to identify a first area of a digital image, wherein the first area will be colored with a first color;

preprocessing the digital image, wherein preprocessing the digital image comprises:
  suppressing image noise from the digital image;
  identifying at least one edge on the digital image;
  identifying whether the first area has a textured appearance; and
  suppressing the textured appearance when the textured appearance is identified;

segmenting, using the processor, the digital image into a first segment that represents the first area and a second segment that represents a second area of the digital image, wherein an original color of the second area will remain unchanged;

enabling, using the processor, the user to select the first color, wherein the first color corresponds a first coating color; and displaying, using the processor, the digital image with the first segment colored with the first color.

23. A computer implemented method, comprising:

enabling, using a processor, a user to identify a first area of a digital image, wherein the first area will be colored with a first color;

preprocessing the digital image, wherein preprocessing the digital image comprises:
  identifying within the first area a textured appearance; and
  suppressing the textured appearance;

segmenting, using the processor, the digital image into a first segment that represents the first area and a second segment that represents a second area of the digital image, wherein an original color of the second area will remain unchanged;

enabling, using the processor, the user to select the first color, wherein the first color corresponds a first coating color; and displaying, using the processor, the digital image with the first segment colored with the first color.

* * * * *